US012728699B2

(12) United States Patent
Deme et al.

(10) Patent No.: US 12,728,699 B2
(45) Date of Patent: Sep. 8, 2026

(54) BYPASS ARRANGEMENT FOR A HEAT EXCHANGER OF A REFRIGERANT CIRCUIT OF A MOTOR VEHICLE

(71) Applicant: Hanon Systems, Daejeon (KR)

(72) Inventors: Saliou Deme, Bonn (DE); Marc Cierco Portillo, Lledia (ES)

(73) Assignee: HANON SYSTEMS, Daejeon (KR)

( * ) Notice: Subject to any disclaimer, the term of this patent is extended or adjusted under 35 U.S.C. 154(b) by 129 days.

(21) Appl. No.: 18/727,271

(22) PCT Filed: Dec. 26, 2022

(86) PCT No.: PCT/KR2022/021317

§ 371 (c)(1),
(2) Date: Jul. 8, 2024

(87) PCT Pub. No.: WO2023/132546

PCT Pub. Date: Jul. 13, 2023

(65) Prior Publication Data

US 2025/0083492 A1 Mar. 13, 2025

(30) Foreign Application Priority Data

Jan. 6, 2022 (DE) ..................... 10 2022 100 244.6
Jul. 29, 2022 (DE) ..................... 10 2022 119 092.7

(51) Int. Cl.
*B60H 1/00* (2006.01)

(52) U.S. Cl.
CPC ..... *B60H 1/00885* (2013.01); *B60H 1/00278* (2013.01); *B60H 2001/00307* (2013.01)

(58) Field of Classification Search
CPC ............ B60H 1/00885; B60H 1/00278; B60H 2001/00307; F25B 2400/04; F25B 41/40;
(Continued)

(56) References Cited

U.S. PATENT DOCUMENTS

2006/0060340 A1* 3/2006 Busse ..................... B60L 58/27 165/202
2013/0118200 A1 5/2013 Aoun et al.
(Continued)

FOREIGN PATENT DOCUMENTS

JP 08072529 A 3/1996
KR 1020180114400 A 10/2018
(Continued)

*Primary Examiner* — Kun Kai Ma
(74) *Attorney, Agent, or Firm* — Shumaker, Loop & Kendrick, LLP; James D. Miller

(57) ABSTRACT

A bypass arrangement having a first flow duct with a refrigerant flow path miming through the heat exchanger, a second flow duct, which leads as a bypass refrigerant flow path into the first flow duct downstream of the heat exchanger in the refrigerant flow direction, and one valve with an inlet for refrigerant, a first refrigerant outlet connected to the first flow duct, and a second refrigerant outlet connected to the second flow duct, wherein the valve has a valve element with a passage and an expansion recess, which valve element can be flow-connected to the first refrigerant outlet or to the second refrigerant outlet wherein refrigerant passes through the first flow duct and the heat exchanger or through the bypass refrigerant flow path of the second flow duct, circumventing the heat exchanger, and the refrigerant can be expanded into the first flow duct or the second flow duct.

13 Claims, 3 Drawing Sheets

(58) Field of Classification Search
CPC ....... F25B 41/31; F16K 11/0876; B60K 1/02; B60K 2001/005
See application file for complete search history.

(56) References Cited

U.S. PATENT DOCUMENTS

| | | | |
|---|---|---|---|
| 2014/0305154 | A1 | 10/2014 | Yoshioka et al. |
| 2018/0209548 | A1 | 7/2018 | Zens et al. |

FOREIGN PATENT DOCUMENTS

| | | | | |
|---|---|---|---|---|
| WO | WO-2013088946 | A1 * | 6/2013 | .............. F25B 13/00 |
| WO | WO-2021172752 | A1 * | 9/2021 | .............. F25B 43/00 |

* cited by examiner 12
5.1
8
7
6
9
13
15
8.1
5.2
11

BYPASS ARRANGEMENT FOR A HEAT EXCHANGER OF A REFRIGERANT CIRCUIT OF A MOTOR VEHICLE

CROSS-REFERENCE TO RELATED PATENT APPLICATIONS

This is a U.S. national phase patent application of PCT/KR2022/021317 filed Dec. 26, 2022 which claims the benefit of and priority to German Patent Application No. 10 2022 119 092.7 filed on Jul. 29, 2022 and German Patent Application No. 10 2022 100 244.6 filed on Jan. 6, 2022, the entire contents of each of which are incorporated herein by reference.

TECHNICAL FIELD

The invention relates to a bypass arrangement for a heat exchanger of a refrigerant circuit of a motor vehicle having multiple heat exchangers. The bypass arrangement is provided in particular for use with a heat pump circuit having a heat exchanger for controlling the temperature of an electric vehicle and/or for a temperature control system having a heat exchanger for controlling the temperature of a battery of an electric vehicle.

BACKGROUND ART

In vehicles, refrigerant circuits are used for controlling the temperature of the vehicle interior and, specifically in electric vehicles, additionally to control the temperature of the vehicle battery. In vehicles with an internal combustion engine, the main function of a heat exchanger consists in transferring some of the waste heat of the engine as heating energy into the vehicle interior. In contrast, to control the temperature of electric vehicles, heat pumps are used, which absorb heat from the surroundings of the vehicle to control the temperature of the vehicle interior and of the vehicle battery. Furthermore, designs of heat pump systems are possible which utilize the waste heat of vehicle batteries of electric vehicles as an additional heat source for further controlling the temperature of the vehicle interior. The operation of such refrigerant circuits requires the use of multiple heat exchangers in order to absorb heat from the surroundings and/or to emit it to the surroundings as required. If multiple heat sources are used to provide temperature control according to requirements, the heat exchangers of the refrigerant circuit in question which are assigned to the different heat sources in the vehicle must be able to be connected to or disconnected from the refrigerant circuit individually in the corresponding requirement case. Suitable valves can be used to shut off refrigerant lines. A valve which can be used for heat pump systems is known from US 2018/0209548 A1. This valve is compact and comprises two outputs with the possibility for refrigerant expansion into a refrigerant flow branch via one of the two outputs. The utilization of different heat sources of a vehicle places additional demands on the design of refrigerant circuits for integration of one or more heat exchangers as required.

SUMMARY

It is therefore the object of the invention to provide a structurally compact possibility of using, as required, heat exchangers, in particular heat exchangers assigned to heat sources in different locations, of a refrigerant circuit of a vehicle, in particular of a heat pump circuit of a vehicle, within the refrigerant circuit.

The object is achieved by a bypass arrangement having the features shown and described herein.

A bypass arrangement for a heat exchanger of a refrigerant circuit in a motor vehicle is proposed. The bypass arrangement can be integrated fully in a refrigerant circuit and has a first flow duct with a refrigerant flow path running through the heat exchanger and a second flow duct, which leads as a bypass refrigerant flow path into the first flow duct downstream of the heat exchanger in the refrigerant flow direction. Furthermore, the bypass arrangement has exactly one valve, which has an inlet and two outlets for refrigerant. The first refrigerant outlet is connected to the first flow duct, and the second refrigerant outlet is connected to the second flow duct. The valve has a valve element with a passage and an expansion recess, which can be flow-connected to the first outlet or to the second outlet such that refrigerant passes through the first flow duct and the heat exchanger or that refrigerant passes through the bypass refrigerant flow path of the second flow duct, circumventing the heat exchanger, and in the process the refrigerant can be expanded into the first flow duct or into the second flow duct. The valve of the bypass arrangement thus allows a discharging mode, a heating mode and a cooling mode within a heat pump system.

The bypass arrangement is provided in particular for a heat exchanger of a heat pump system of an electric vehicle.

The bypass arrangement according to the invention ensures circumvention as required or integration as required of heat exchangers in the refrigerant flow of a refrigerant circuit. In this way, multiple heat sources located at different positions in and on the vehicle can be used for heat transfer. There is also the possibility of circumventing a heat exchanger via the bypass refrigerant flow path when heat absorption or heat emission is not possible owing to an inactive heat source or is not required. One or more heat exchangers can thus be connected individually in the refrigerant flow, for example when the temperature control conditions at different locations in the vehicle change. The term circumvention within the meaning of the invention should be understood to mean that the refrigerant is conducted exclusively through the bypass refrigerant flow path and not through the heat exchanger. The uncomplicated changeover between the heating and cooling operating modes by means of the valve is also advantageous. For example, with the bypass arrangement according to the invention, a heat exchanger assigned to a vehicle battery can be used to cool the vehicle battery or to heat the vehicle battery. Furthermore, it is possible to absorb heat from a vehicle battery as an alternative heat source when the vehicle battery heats up as a result of a temporarily high power demand. For example, a heat exchanger assigned to a vehicle battery can initially be used to heat the vehicle battery in order to reach an optimal operating temperature. In this case, the correspondingly temperature-controlled refrigerant is conducted through the valve into the first flow duct. If cooling of the vehicle battery is required as a result of intense heating, the valve element is brought into position such that the refrigerant is expanded in the flow direction into the first flow duct, so that, as a result of the expansion process, heat is absorbed from the surroundings by means of the heat exchanger, and the vehicle battery is cooled. Excess heat from the vehicle battery can alternatively be used to charge the refrigerant, in order to control the temperature of the vehicle interior, for example. If the function of the heat exchanger is not needed, the valve element can be brought into a position in which the refrigerant is conducted via the second flow duct and in the process the heat exchanger is circumvented.

The heat exchanger can be arranged in the second half along the section of the refrigerant flow path of the first flow duct between the first outlet and the mouth of the second flow duct.

Preferably, the bypass refrigerant flow path can be the same length or longer than the refrigerant flow path of the first flow duct running through the heat exchanger. Advantageously, the first and second flow ducts can have the shortest possible length in order to ensure a compact design of the bypass arrangement overall.

According to an advantageous embodiment of the bypass arrangement according to the invention, the valve element of the valve is in the form of a ball, the passage having an L-shape, and the expansion recess being in the form of a notch in the ball surface. Preferably, the passage has a circular cross-section. The flow path through the passage of the valve element can have an inner radius and an outer radius in the bend of the L-shape of the passage. Preferably, the flow cross-section is not affected by the passage of the valve element, in order to ensure uniform flow of the refrigerant through the passage. According to a further embodiment of the valve element, the passage can be in the form of a circular arc.

It can furthermore be provided for the passage of the valve element, the first refrigerant outlet, the second refrigerant outlet, the first flow duct and the second flow duct to have identical flow cross-sections. This is advantageous to ensure the most uniform possible flow speeds when refrigerant flows through the bypass arrangement.

The valve has a compact, at least two-part housing body consisting of a valve body and a valve body element. The valve body has a valve core in which the valve element is accommodated. The valve body element is preferably designed to be insertable into the valve body such that it holds the valve element rotatably in position in the valve core and seals it off from the surroundings. For the purpose of sealing, corresponding sealing elements can be formed on the valve body and/or on the valve body element. The valve element accommodated in the valve core can be connected to a drive unit via a circular-cylindrical shaft. By means of the drive unit, which has an electrical actuator, for example an electric motor, the valve element can be brought into the different positions to ensure refrigerant flows through in the direction of the first flow duct or in the direction of the second flow duct. According to an advantageous embodiment, the valve body element can have a flow duct which forms a flow connection between the passage of the valve element and the second refrigerant outlet. Thanks to the flow path through the valve body element, the valve can be made more compact overall.

Advantageously, the drive unit can be connected detachably to the circular-cylindrical shaft.

The valve can have a closure position which prevents flow of refrigerant through the valve into the first flow duct and into the second flow duct. An additional check valve is thus not necessary. The closure position of the valve is advantageous in particular in the case of maintenance.

In particular a valve according to the teaching of US 2018/0209548 A1 can be used as the valve for the bypass arrangement.

The bypass arrangement according to the invention can be used in a heat pump system having a heat exchanger for controlling the temperature of the interior of an electric vehicle.

A use of the bypass arrangement according to the invention in a temperature control system having a heat exchanger for controlling the temperature of a battery of an electric vehicle can also be provided.

The bypass arrangement according to the invention is used advantageously in a serial arrangement of two or more heat exchangers, since the heat transfer power in the refrigerant flow direction of the refrigerant main flow can be adapted as required for each heat exchanger. It can therefore be provided for two or more of the bypass arrangements to be arranged in series in the refrigerant flow direction of a refrigerant circuit.

According to another embodiment, it can be provided for multiple bypass arrangements according to the invention to be arranged in parallel in the refrigerant flow direction.

Further technical advantages of the invention consist in that only one valve is needed to provide multiple functions. This means a smaller amount of material used and less effort during installation of the bypass arrangement.

BRIEF DESCRIPTION OF DRAWINGS

Further details, features and advantages of embodiments of the invention can be found in the description of exemplary embodiments below with reference to the associated drawings. In the drawings.

DESCRIPTION OF AN EMBODIMENT

Figures 1, 2:
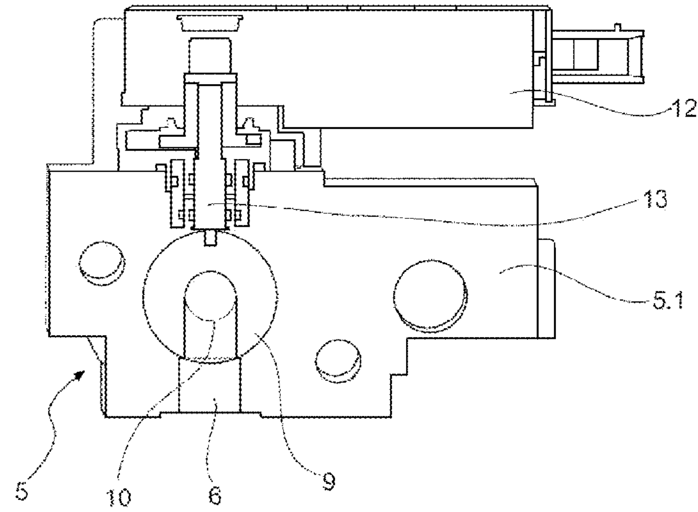
FIG. 1: shows a schematic diagram of an exemplary embodiment of the bypass arrangement according to the invention.
FIG. 2: shows a schematic sectional diagram of an example of a valve of the bypass arrangement.

FIG. 1 shows a schematic diagram of an exemplary embodiment of the bypass arrangement 1 according to the invention for a heat exchanger 2 of a refrigerant circuit in a motor vehicle. The bypass arrangement 1 has a first flow duct 3 with a refrigerant flow path running through the heat exchanger 2. The heat exchanger 2 is located in the second half of the flow duct 3 along the section of the first flow duct 3. A second flow duct 4 in the form of a bypass refrigerant flow path leads into the first flow duct 3 downstream of the heat exchanger 2 in the refrigerant flow direction. Furthermore, the bypass arrangement 1 has a valve 5 with which the flow of refrigerant through the bypass arrangement 1 can be controlled.

The valve 5, the structure of which is explained in more detail in FIG. 2, has a refrigerant inlet 6, a first refrigerant outlet 7 and a second refrigerant outlet 8. The first refrigerant outlet 7 is connected to the first flow duct 3, and the second refrigerant outlet 8 is connected to the second flow duct 4. A flow of refrigerant through the first flow duct 3 or the second flow duct 4 is controlled using a ball-shaped valve element 9 (not shown), which is accommodated in the valve 5. The valve element 9 has an L-shaped passage 10, and an expansion recess 11 is formed in the ball surface. By rotating the valve element 9, the L-shaped passage 10 or the expansion recess 11 can be flow-connected to the first refrigerant outlet 7 or to the second refrigerant outlet 8 such that refrigerant supplied via the refrigerant inlet 6 passes into the first flow duct 3 and through the heat exchanger 2 or, in another position, through the bypass refrigerant flow path of the second flow duct 4. In a further position of the valve element 9, the refrigerant can be expanded through the expansion recess 11 formed in the valve element into the first flow duct 3 or into the second flow duct 4. The valve element 9 is connected to an electrical drive unit 12 via a shaft 13. The drive unit 12 executes a rotary movement, which moves the valve element 9 into the desired position.

FIG. 2 shows a schematic sectional diagram of an example of a valve 5 of the bypass arrangement 1. The valve 5 comprises a valve body 5.1, in which the ball-shaped valve element 9 is accommodated. The valve element 9 is connected to the drive unit 12 via a shaft 13. The drive unit 12 is an electric servomotor. The shaft 13 is mounted and sealed off from the surroundings. In the diagram shown, the valve element 9 with the L-shaped passage 10 is flow-connected to the refrigerant inlet 6 of the valve 5.

Figures 3A, 3B, 3C:
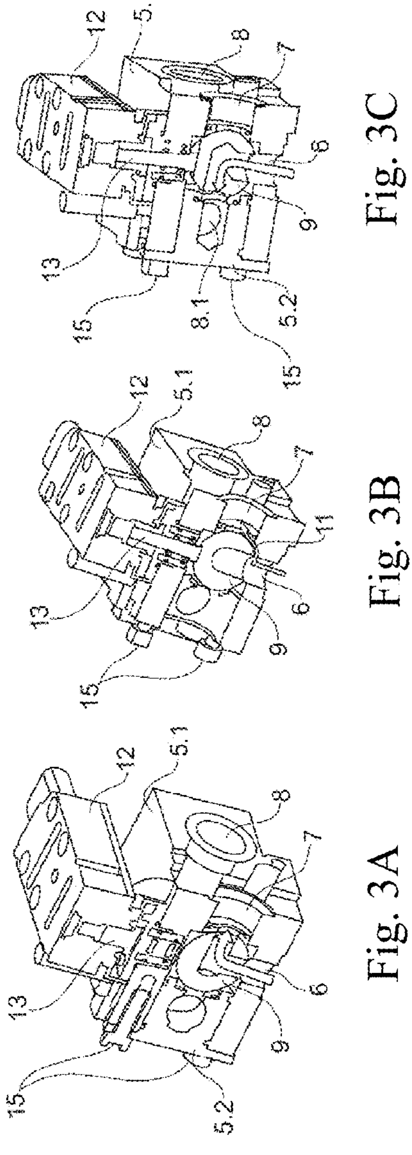
FIGS. 3A-3C: show schematic diagrams of the valve in a perspective view to illustrate different operating modes of the bypass arrangement.

FIGS. 3A-3C show schematic sectional diagrams of the valve 5 of the bypass arrangement 1 each in a perspective view to illustrate different operating modes of the bypass arrangement 1. Recurring features are labelled with the same reference numerals. The sections of diagrams 3A-3C are each made such that half of the ball-shaped valve element 9 is shown. The valve element 9 is accommodated inside the valve body 5.1 and sealed off from the surroundings with the valve body element 5.2.

A flow duct portion via which a connection is made to the second refrigerant outlet 8 is shown in the valve body element 5.2. At the same time, the valve body element 5.2 is used to seal off the valve element 9 in the valve core of the valve body 5.1 from the surroundings and holds the valve element 9 in position. Because a flow duct 8.1 for refrigerant is formed in the valve body element 5.2, structural installation space can be saved, and the valve body 5.1 can be made more compact overall. The valve body element 5.2 thus provides the function of a seal of the valve element 9 and the function of a refrigerant line to the second refrigerant outlet 8. The valve body element 5.2 is accommodated in a cylindrical cut-out formed in the valve body 5.1. The valve body element 5.2 has a flange with holes through which screws 15 are fed and screwed into the valve body 5.1 in order to connect the valve body element 5.2 to the valve body 5.1.

In FIG. 3A, the valve element 9 is in a position in which the L-shaped passage 10 allows a flow connection for refrigerant through the first refrigerant outlet 7. In this valve element position, which represents the operating mode "discharging mode" or "heating mode", the refrigerant passes from the refrigerant inlet 6 through the L-shaped passage 10, via the first refrigerant outlet 7, into the first flow duct 3 connected to the first refrigerant outlet 7. The refrigerant thus passes to the heat exchanger 2 (see FIG. 1).

In FIG. 3B, the valve element 9 is in a position in which the expansion recess 11 allows a flow connection for refrigerant through the first refrigerant outlet 7 into the first flow duct 3. In the process, refrigerant can be expanded into the first flow duct 3. This corresponds to the second operating mode "expansion mode" or "cooling mode". The valve body element 5.2 is not shown in this drawing.

In FIG. 3C, the valve element 9 is in a position in which the L-shaped passage 10 allows a flow connection for refrigerant through the second refrigerant outlet 8 into the second flow duct 4. In this case, the refrigerant flows through the L-shaped passage 10 and the flow duct 8.1 of the valve body element 5.2 and leaves the valve 5 via the second refrigerant outlet 8 into the second flow duct, which leads into the first flow duct 3 downstream of the heat exchanger 2 (see FIG. 1), so that the heat exchanger 2 is circumvented. This third operating mode is referred to as "bypass mode".

Figure 4:
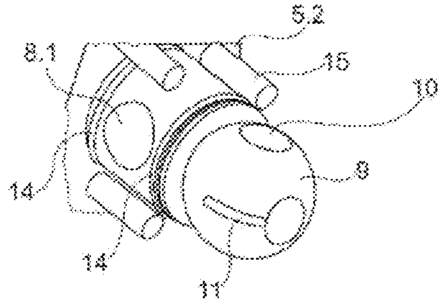
FIG. 4: shows a schematic detail diagram of components of the valve of the bypass arrangement.

FIG. 4 shows a schematic detail diagram of components of the valve 5 of the bypass arrangement 1. The valve element 9 is shown in conjunction with the valve body element 5.2. The valve element 9 shows the openings of the L-shaped passage 10 and the expansion recess 11 formed in the surface. The valve body element 5.2 shows the flow duct 8.1 connected to the second refrigerant outlet 8. The cylindrical body of the valve body element 5.2 comprises two seals 14 in the form of O-rings. The seals 14 are arranged such that the radial opening of the flow duct 8.1 formed in the cylindrical valve body element 5.2 is arranged between the seals 14. Also shown are the screws 15 with which the valve body element 5.2 is fastened to the valve body 5.1 (not shown).

Figure 5:
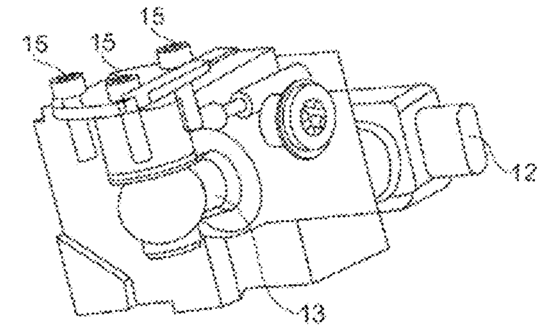
FIG. 5: shows a schematic transparent diagram of components of the valve showing their working relationship.

FIG. 5 shows a schematic transparent diagram of components of the valve 5 showing their working relationship. The valve body element 5.2 is fastened to the valve body 5.1 with the screws 15 such that the valve element 9 is held rotatably in position in the valve core such that the L-shaped passage 10 or the expansion recess 11 can be flow-connected to the first refrigerant outlet 7 or the second refrigerant outlet 8. The valve element 9 is moved by means of a rotation of the shaft 13 connected to the valve element 9. The rotation is executed using the drive unit 12.

Figure 6:
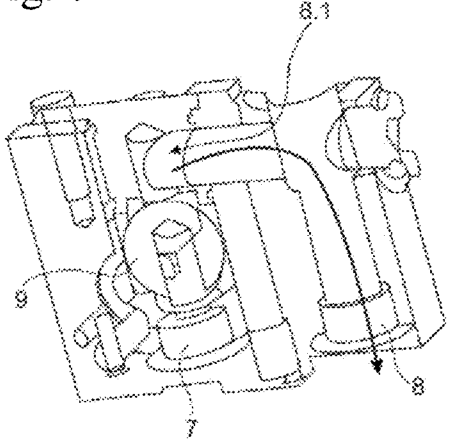
FIG. 6: shows a sectional diagram of the valve of the bypass arrangement.

FIG. 6 shows a further sectional diagram of the valve 5 of the bypass arrangement 1 from a different perspective to further explain the inner structure of the valve 5.

Recurring features are labelled with the same reference numerals in FIGS. 4, 5 and 6.

LIST OF REFERENCE NUMERALS

1 Bypass arrangement
2 Heat exchanger
3 First flow duct
4 Second flow duct
5 Valve
5.1 Valve body
5.2 Valve body element
6 Refrigerant inlet
7 First refrigerant outlet
8 Second refrigerant outlet
8.1 Flow duct
9 Valve element
L-shaped passage
11 Expansion recess
12 Drive unit
13 Shaft
14 Seal
15 Screws

The invention claimed is:

1. A bypass arrangement for a heat exchanger of a refrigerant circuit in a motor vehicle, the bypass arrangement comprising:

a first flow duct with a refrigerant flow path running through the heat exchanger;

a second flow duct, which leads as a bypass refrigerant flow path into the first flow duct downstream of the heat exchanger in a direction of a refrigerant flow; and a valve with an inlet for a refrigerant, a first refrigerant outlet connected to the first flow duct, and a second refrigerant outlet connected to the second flow duct, wherein the valve has a valve element with a passage and an expansion recess, wherein the valve element is flow-connected to the first refrigerant outlet or to the second refrigerant outlet such that the refrigerant passes through the first flow duct and the heat exchanger or that the refrigerant passes through the bypass refrigerant flow path of the second flow duct, circumventing the heat exchanger, and the refrigerant is expanded into the first flow duct or into the second flow duct, wherein the valve has a compact, two-part housing body with a valve body and a valve body element, in which the valve element is accommodated, and wherein the valve body element has a flow duct which forms a flow connection between the passage and the second refrigerant outlet.

2. The bypass arrangement according to claim 1, wherein the heat exchanger is arranged in a second half along a section of the refrigerant flow path of the first flow duct between the first refrigerant outlet and a mouth of the second flow duct.

3. The bypass arrangement according to claim 1, wherein the bypass refrigerant flow path is a same length or longer than the refrigerant flow path of the first flow duct running through the heat exchanger.

4. The bypass arrangement according to claim 1, wherein the valve element is a ball, wherein the passage has an L-shape, and wherein the expansion recess is a notch in a surface of the ball.

5. The bypass arrangement according to claim 1, wherein the passage is a circular arc.

6. The bypass arrangement according to claim 1, wherein the passage of the valve element, the first refrigerant outlet, the second refrigerant outlet, the first flow duct and the second flow duct have identical flow cross-sections.

7. The bypass arrangement according to claim 1, wherein the valve element is connected to a drive unit via a circular-cylindrical shaft.

8. The bypass arrangement according to claim 1, wherein the valve has a closure position which prevents a flow of the refrigerant into the first flow duct and into the second flow duct.

9. A heat pump system comprising the bypass arrangement of claim 1 with the heat exchanger of the refrigerant circuit, the heat exchanger controlling a temperature of an interior of an electric vehicle.

10. A heat pump system comprising the bypass arrangement of claim 1 with the heat exchanger of the refrigerant circuit, the heat exchanger controlling a temperature of a battery of an electric vehicle.

11. A heat pump system comprising multiple ones of the bypass arrangement of claim 1 with the heat exchanger of the refrigerant circuit, the heat exchanger controlling a temperature of a battery of an electric vehicle or an interior of the electric vehicle, wherein the multiple ones of the bypass arrangement are arranged in series in the direction of the refrigerant flow of the refrigerant circuit.

12. A heat pump system comprising multiple ones of the bypass arrangement of claim 1 with the heat exchanger of the refrigerant circuit, the heat exchanger controlling a temperature of a battery of an electric vehicle or an interior of the electric vehicle, wherein the multiple ones of the bypass arrangement are arranged in parallel in the direction of the refrigerant flow of the refrigerant circuit.

13. A bypass arrangement for a heat exchanger of a refrigerant circuit in a motor vehicle, the bypass arrangement comprising:

a first flow duct with a refrigerant flow path running through the heat exchanger;

a second flow duct, which leads as a bypass refrigerant flow path into the first flow duct downstream of the heat exchanger in a direction of a refrigerant flow; and a valve with an inlet for a refrigerant, a first refrigerant outlet connected to the first flow duct, and a second refrigerant outlet connected to the second flow duct, wherein the valve has a valve element with a passage and an expansion recess, wherein the valve element can be flow-connected to the first refrigerant outlet or to the second refrigerant outlet such that the refrigerant passes through the first flow duct and the heat exchanger or that the refrigerant passes through the bypass refrigerant flow path of the second flow duct, circumventing the heat exchanger, and the refrigerant can be expanded into the first flow duct or into the second flow duct, wherein the valve has a compact, two-part housing body with a valve body and a valve body element, in which the valve element is accommodated, wherein the valve element is connected to a drive unit via a circular-cylindrical shaft, and wherein the drive unit is connected detachably to the circular-cylindrical shaft.

* * * * *